United States Patent
Matoba et al.

[19]

[11] Patent Number: 5,880,955
[45] Date of Patent: Mar. 9, 1999

[54] STATUS DISPLAY SYSTEM FOR STORAGE DEVICE

[75] Inventors: Tatsuo Matoba; Naoki Ohtake; Yumiko Ohizumi, all of Kawasaki, Japan

[73] Assignee: Fujitsu Limited, Kawasaki, Japan

[21] Appl. No.: 975,829

[22] Filed: Nov. 13, 1992

[30] Foreign Application Priority Data

Nov. 13, 1991 [JP] Japan .................................... 3-297075

[51] Int. Cl.⁶ .................................................. G05B 9/02
[52] U.S. Cl. .......................... 364/188; 364/144; 364/146; 711/114
[58] Field of Search .................... 364/DIG. 61, DIG. 62, 364/184–190, 143, 144, 145, 146, 550; 371/7.1, 8.1; 395/275, 441; 711/114

[56] References Cited

U.S. PATENT DOCUMENTS

| | | | |
|---|---|---|---|
| 3,426,323 | 2/1969 | Shimabukuro | 371/32 |
| 4,092,732 | 5/1978 | Ouchi . | |
| 4,635,030 | 1/1987 | Rauch | 364/424.06 X |
| 4,635,183 | 1/1987 | Isobe et al. | 364/188 X |
| 4,747,047 | 5/1988 | Coogan et al. | 364/200 |
| 4,754,397 | 6/1988 | Varaiya et al. | 364/200 |
| 4,775,978 | 10/1988 | Hartness . | |
| 4,817,035 | 3/1989 | Timsit . | |
| 4,849,927 | 7/1989 | Vos . | |
| 4,849,929 | 7/1989 | Timsit | 364/900 |
| 5,124,987 | 6/1992 | Milligan et al. | 371/10.1 |
| 5,220,569 | 6/1993 | Hartness | 371/37.7 |
| 5,305,013 | 4/1994 | Daniels | 345/82 |
| 5,367,670 | 11/1994 | Ward et al. | 395/575 |
| 5,440,716 | 8/1995 | Schultz et al. | 395/441 |
| 5,471,617 | 11/1995 | Farrand et al. | 395/700 |
| 5,592,648 | 1/1997 | Schultz et al. | 395/441 |

*Primary Examiner*—Paul P. Gordon
*Assistant Examiner*—Sheela S. Rao
*Attorney, Agent, or Firm*—Greer, Burns & Crain, Ltd.

[57] ABSTRACT

A status display system for storage device includes at least one logic device each having a plurality of physical device; and a plurality of device control means for controlling operations of the physical devices corresponding to a designated logic device in parallel in accordance with command from a host device. Preferably, the status display system is provided with status information generating means for collecting commands given to the device control means and responses to the commands given from the device control means, and generating a status information for the logic device; and display means provided corresponding to the logic device for displaying the status information in accordance with the generated status information.

16 Claims, 13 Drawing Sheets

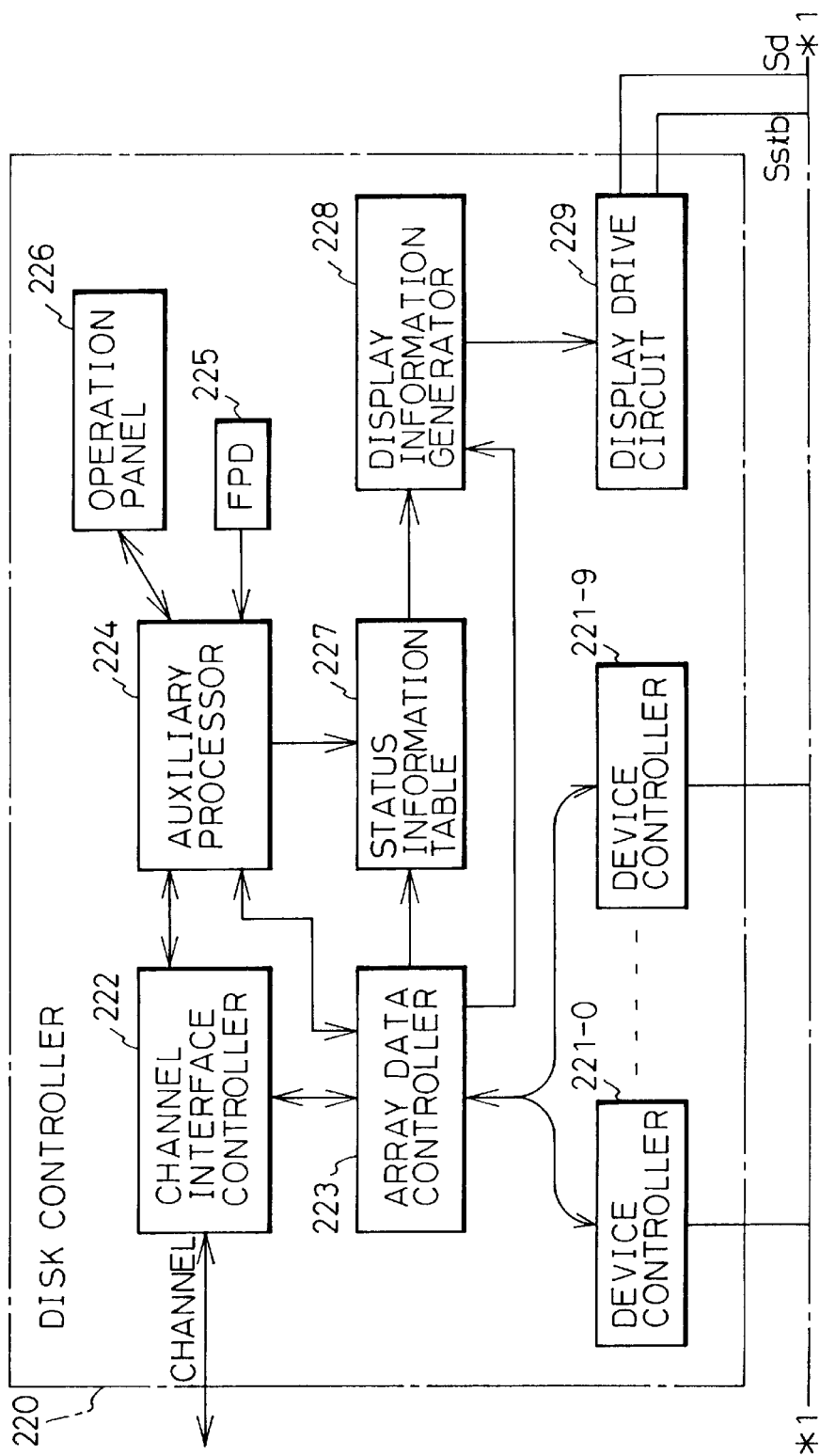

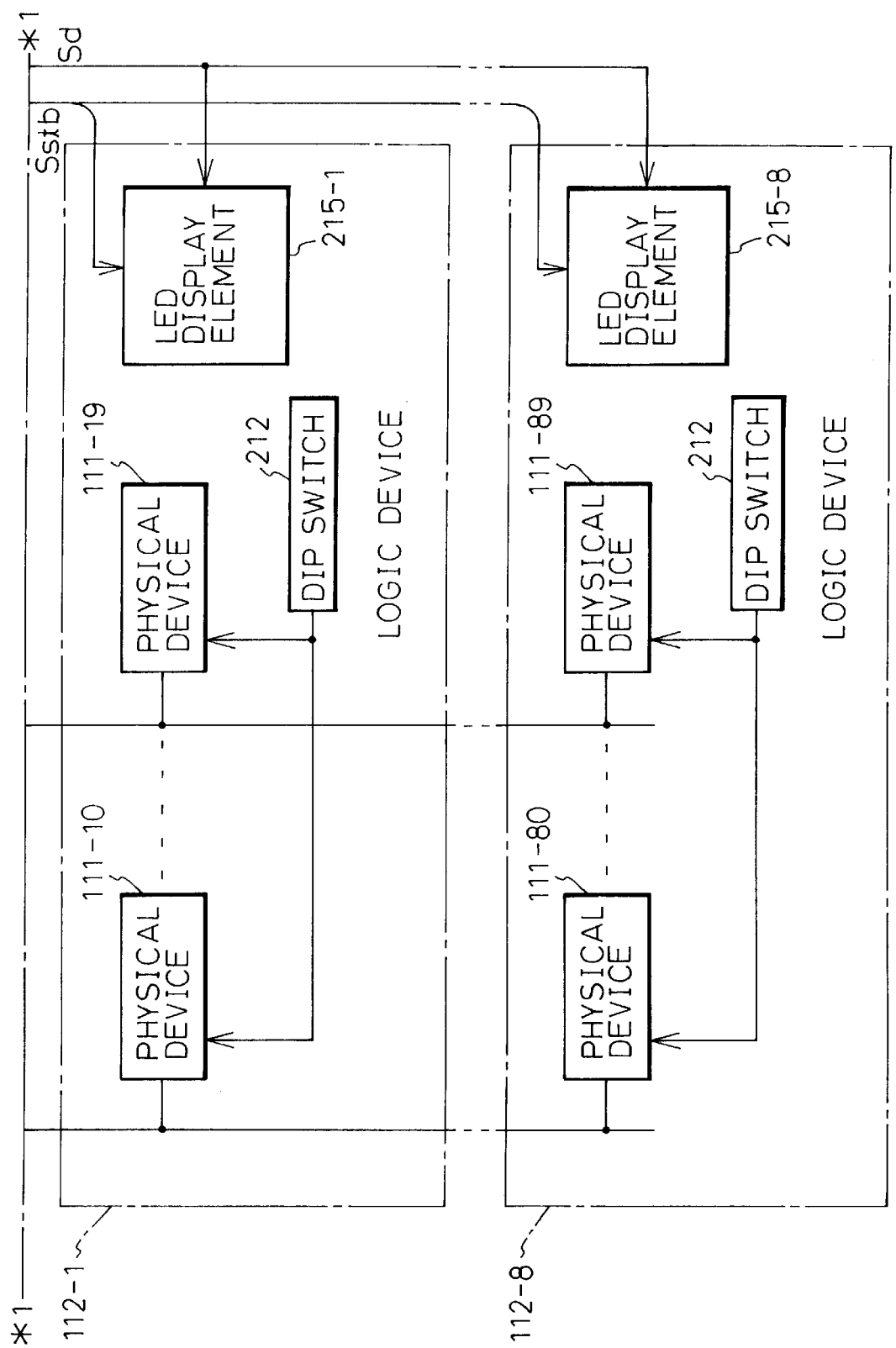

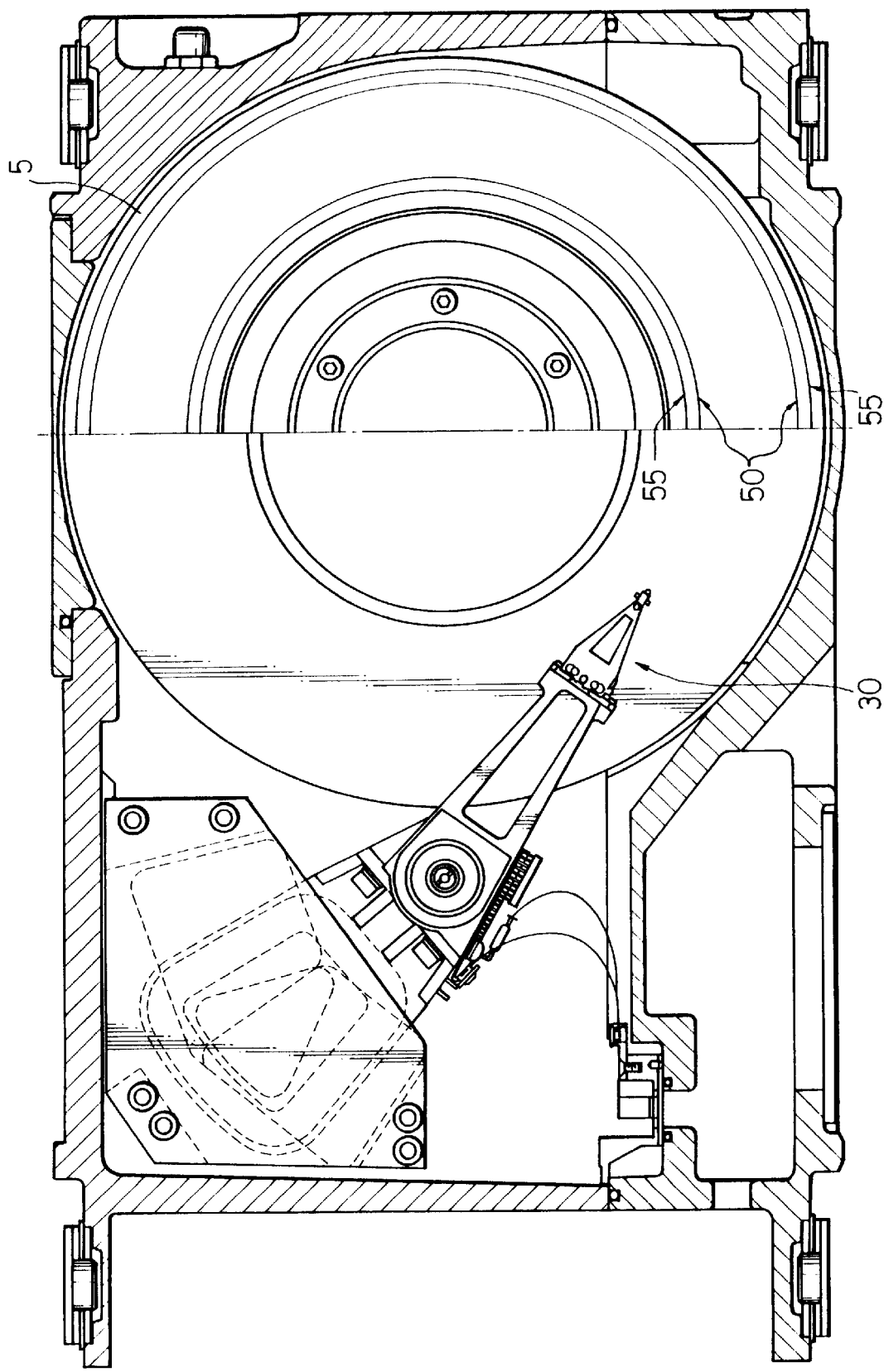

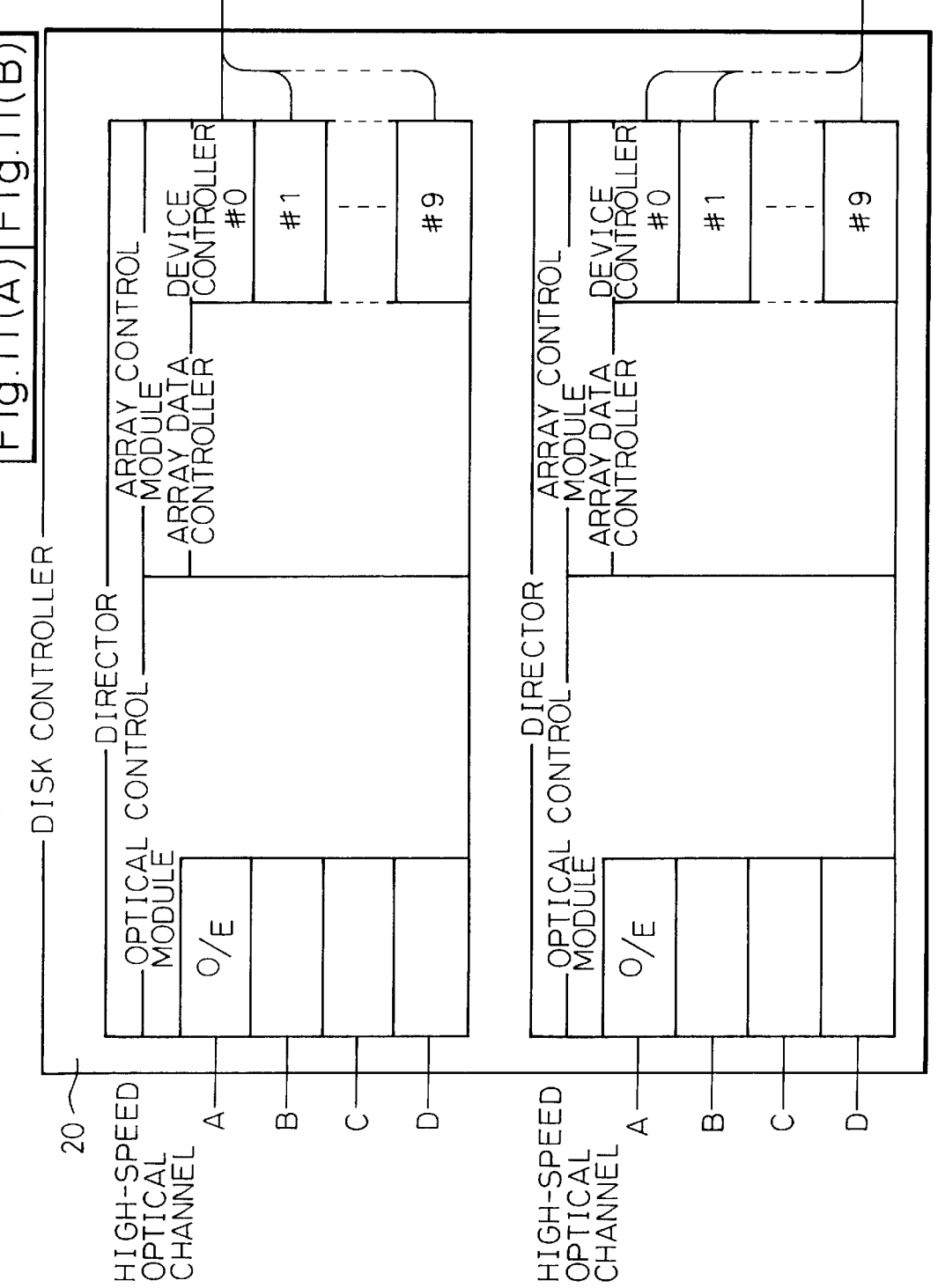

STATUS DISPLAY SYSTEM FOR STORAGE DEVICE

BACKGROUND OF THE INVENTION

1. Field of the Invention

The present invention relates to a status display system for storage device, e.g., at least one disk array device, which operates a plurality of physical devices in parallel as at least one logic device and is adapted to display a status of the logic device.

There is recently a tendency to demand, in a computer system, a transfer of large amounts of data at high speed, and therefore, auxiliary storage devices are also required to transfer large amounts of data at high speed to exchange data with a host device.

To meet this requirement, auxiliary storage device, e.g., magnetic disk array device, have been developed, which are mainly constituted from at least one logic device including a plurality of physical devices such as several units of disk drives and which enable plural bytes of data to be transferred in parallel between the host device and the logic device.

2. Description of the Related Art

Here, the conventional magnetic disk array device, which is representative of storage device, will be explained more specifically.

In general, in a single unit of a magnetic disk drive, data transfer speed is limited by a rotation speed of a motor which rotates a magnetic disk as a recording medium. Accordingly, if it is intended to attain high speed operation by increasing a data transfer speed, it is necessary to perform read/write operations in parallel by driving a plurality of disk drives, called disk array drives, simultaneously. At this time, according to a command from a host device, the spindle motors of the magnetic disk drives such as a disk array device connected in parallel with the host device, are synchronously rotated, so that it becomes possible to perform a parallel transfer of data.

Further, in addition to the data transfer at high speed, fault tolerance of the whole system is also required for such disk array device so that sufficient reliability for the large amounts of data can be ensured without decreasing the data transfer speed.

To attain such a fault tolerant system, even though a failure, such as the inability to read data from one disk drive of a plurality of disk drives, has occurred, it is necessary for the disk array device to be constructed so that the data of the failed disk drive can be reconstructed immediately without stopping operation of the whole system of disk array device.

Some kinds of disk array device in practical use, in which the above-mentioned data transfer at high speed and the fault tolerance can be satisfied simultaneously, have begun to be announced by various computer manufacturers as the products of disk array device called RAID (Redundant Arrays of Inexpensive Disks) 1 to RAID5.

Among these RAIDs1–5, RAID3, is especially adequate for the case where large amounts of data have to be processed continuously at high speed, e.g., scientific calculations, will be described in more detail.

In the RAID3, the disk array device typically includes a plurality of disk drives for data transfer (for example, eight (8) disk drives) and a disk drive for parity checking, all these disk drives operating in parallel simultaneously. In this case, some given parity data corresponding to the parallel data of the respective disk drives for data transfer are previously stored in the disk drive for parity checking (parity disk drive). In such a construction, even though one disk drive of a plurality of disk drives fails so that the data cannot be read out, the data can be reconstructed by reading the parity data from the parity disk drive.

Further, in the RAID3, a spare storage disk drive is also provided. All the data in the failed disk drive is automatically reconstructed and transferred into the spare storage disk drive. If the reconstruction process is completed, the spare storage device can be utilized as a normal disk drive, in cooperation with the other disk drives for data transfer.

In this manner, the disk array device as represented by the RAID3, which enables large amounts of data to be transferred at relatively high speed (for example, 36 MBytes/sec) and has substantially fault tolerant characteristics, can be prepared. Hereafter, the whole construction of such disk array device will be described with reference to FIG. 1, so that the disk array device can be understood more clearly.

FIG. 1 shows a schematic construction of a plurality of conventional disk array devices which are representative of storage device. In FIG. 1, the disk array devices are provided with logic devices 10-1 to 10-n, such as n groups of disk array devices and a disk controller 20 for controlling these logic devices 10-1, to 10-n in accordance with an instruction from a host device, e.g., a host computer.

Each of the aforementioned logic devices 10-1 to 10-n includes physical devices 11-0 to 11-8, such as nine units of disk drives, corresponding to respective bytes of eight bytes (8 bytes) of data and a parity byte, and a spare physical device 11-9, such as one spare storage disk drive.

The disk controller 20 of the disk array drives is further provided with ten device controllers 21-0 to 21-9 corresponding to the respective physical devices constituting the logic devices 10-1–10-n. The physical devices included in the respective logic devices 10-1 to 10-n are connected to the corresponding device controllers 21-0 to 21-9 through multiple lines.

Each of the device controllers 21-0 to 21-9 is constructed so as to select any one of the physical devices 11 connected thereto in accordance with a designated address, and to perform data transfer operation with the selected physical device.

The disk controller 20 is constructed so as to designate addresses to these device controllers 21-0 to 21-9 in accordance with an instruction from the host computer, and to instruct read/write operations to the physical devices. At this time, the disk controller 20 divides data transferred through a channel from the host computer and transfers the divided data to the respective device controllers 21-0 to 21-9. Further, the disk controller 20 combines data transferred from the respective physical devices 11 through the device controllers 21-0 to 21-9 into 8 bytes of parallel data and transfers the combined data to the channel in accordance with the aforementioned instruction.

Accordingly, when at least one disk array device as shown in FIG. 1 is utilized, it becomes possible for eight bytes of data to be transferred during the time it takes to transfer one byte of data utilizing only a single disk drive. Therefore, the time that is required to input or output data can be remarkably shortened.

However, as described above, the individual device controllers 21-0 to 21-9 select the physical devices 11 connected thereto in accordance with the designated addresses and control the selected devices 11 in the disk array devices. Accordingly, the status of the logic devices as a whole designated by the addresses cannot be obtained until status information from the respective physical devices is combined together through the ten device controllers 21-0 to 21-9. In such a construction, the disk controller 20 including the device controllers 21-0 to 21-9 administers all the status information of the respective logic devices 10-1–10-n, and whether or not the individual physical devices 11 are in a ready condition is displayed by turning on light emitting diodes (LED) or the like provided on housings in the logic devices 10.

Practically, the aforementioned display by means of the light emitting diodes or the like is an extremely simple one, merely indicating whether or not the respective disks are rotating after an electric power is supplied to the respective physical devices.

Therefore, there are some cases where the individual physical devices are in the ready condition, but each of the logic devices constituted thereby is not in an operable condition as an overall logic device, such as the case where start-up processing of the disk array devices has not been normally completed or the case where an initial micro program loading (IMPL) is being executed for the logical devices. However, in regard to the display by means of the light emitting diodes, the ready condition is indicated even in these cases. Accordingly, a problem occurs in that an operator (user) is likely to misunderstand that each logic device is in an operable condition, and is likely not to notice that the logic device is not in an operable condition until receiving error information notifying that the display is erroneous, which is issued in response to a write command or a read command from the host computer.

On the other hand, the contents of a status information table provided in the disk controller 20 are used for a control processing executed in the disk controller 20. Thus, the contents of the status information table cannot be referred to, unless a specialized command for executing a diagnostic program is input from the host computer. Moreover, since the diagnostic program is usually complicated, it takes much time to start up the diagnostic program. Consequently, another problem occurs in that the status information effective for a logic device cannot be offered to the operator accurately and rapidly.

SUMMARY OF THE INVENTION

Accordingly, an object of the present invention is to provide a states display system which enables the desired status information to be rapidly offered to an operator.

A further object of the present invention is to provide a status display system for storage device such as disk array device, which enables status information relating to the conditions of overall logic device to be displayed, as well as the status information of the respective physical devices.

A still further object of the present invention is to provide a status display system for storage device, which prevents an operator from misunderstanding the actual status of the overall logic device by displaying status information effective for the logic device.

A still further object of the present invention is to provide a status display system for storage device, which enables status information effective for the logic device to be presented to an operator accurately and rapidly, without utilizing a complicated diagnostic program, etc.

A still further object of the present invention is to provide a status display system for storage device, in which status information concerning the condition where start-up processing of storage device is being executed can be rapidly displayed.

A still further object of the present invention is to provide a status display system for storage device, in which status information concerning the condition where an initial micro program loading of storage device is being executed can be rapidly displayed.

A still further object of the present invention is to provide a status display system for storage device, in which status information concerning the condition where the reconstruction of data in the storage device is being executed can be rapidly displayed.

A still further object of the present invention is to provide a status display system for storage device, in which various status information for notifying an operator of the present condition of logic device as a whole can be displayed so that the operator can understand the condition clearly at a glance.

To attain the above objects, the status information system for storage device according to the present invention includes at least one logic device each having a plurality of physical devices, and further includes a plurality of device control means for controlling the operation of the physical devices corresponding to a designated logic device in parallel in accordance with a given command from a host device.

The system is further operative to generate status information indicating the present condition of the logic device as a whole, based on information about each of the physical devices obtained from the device control means, and is operative to display the generated status information.

Preferably, the status display system comprises status information generating means for collecting commands given to the plurality of device control means and responses to the commands given from the plurality of device control means, generating and sending status information for the logic device; and display means provided corresponding to the logic device for displaying the status information in accordance with the respectively corresponding status information input from the status information generating means.

Further, preferably, the storage device is magnetic disk array device.

More concretely, the status information generating means includes a status information table which contains registration information that indicates whether or not the designated logic device is incorporated into the storage device; an array data controller which generates the status information of the designated logic device; a display information generator which refers to the status information table in accordance with an instruction from the array data controller and generates given codes corresponding to the status information of at least one logic device; and a display drive circuit which generates drive signals used to display the given codes.

More concretely, the display means includes light emitting diode (LED) display elements which display the respectively corresponding status information of at least one logic device in accordance with the drive signals.

Further, the status display system has various functions at least indicating whether or not the logic device is in an operable condition when the start-up processing, initialization processing and data reconstruction processing have been performed.

BRIEF DESCRIPTION OF THE DRAWINGS

The above objects and features of the present invention will be more apparent from the following description of the preferred embodiments with reference to the accompanying drawings, wherein:

FIGS. 3(A) and 3(B) are block diagrams showing a concrete embodiment of a status display system according to the present invention;

FIG. 4 is a partially sectional plan view showing a mechanism of a magnetic disk drive;

FIGS. 11(A) and 11(B) are block diagrams of a disk controller and the overall disk array devices.

DESCRIPTION OF THE PREFERRED EMBODIMENTS

The embodiments of the present invention will be described next with reference to the related figures.

Figure 2:
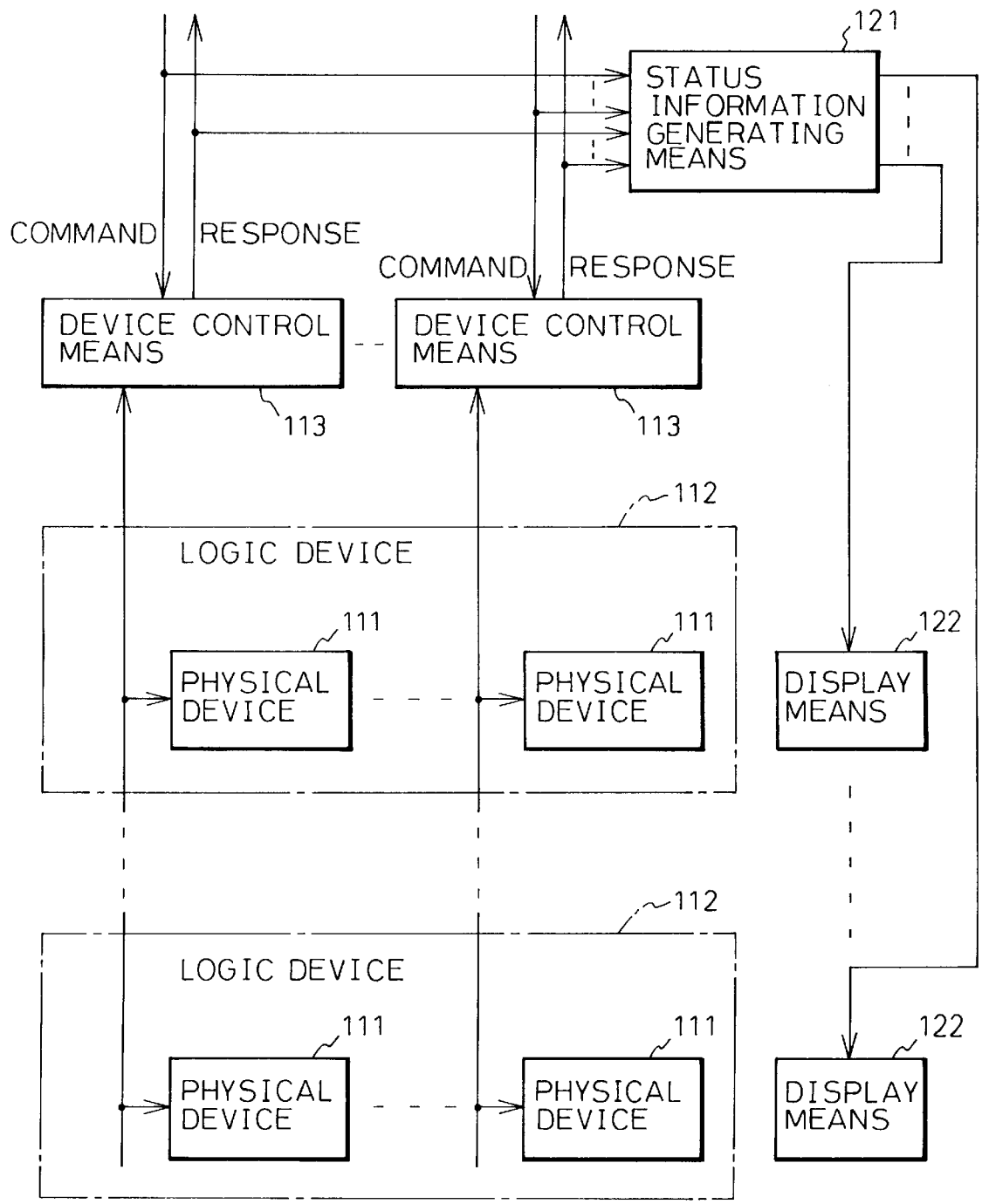
FIG. 2 shows an embodiment based on the principle of the present invention.

FIG. 2 shows an embodiment based on the principle of the present invention.

The embodiment shown in FIG. 2 is directed to a status display system for disk array device including at least one logic device 112 each having a plurality of physical devices 111, and a plurality of device control means 113 for controlling operations of the physical devices 111 corresponding to a designated logic device 112 in parallel in accordance with a command from a host device e.g., a host computer. Further, the status display system comprises status information generating means 121 for collecting commands given to the plurality of device control means 113 and responses to the commands given from the plurality of device control means 113, and generating and sending a status information for the logic device 112; and display means 122 provided in correspondence with the logic device 112 for displaying the status information in accordance with the input corresponding status information.

In the embodiment according to the present invention shown in FIG. 2, the status information generating means 121 collects the commands to and responses from the respective device control means 113, and generates the status information for the logic device 112 including the respective physical devices 111 based on the individual status of the physical devices 111. The generated status information is input to the corresponding display means 122. Consequently, the display means 122 can display the status information as the logic device 112.

Hereafter, a concrete embodiment according to the present invention will be described in detail with reference to the accompanying drawings.

Figure 1:
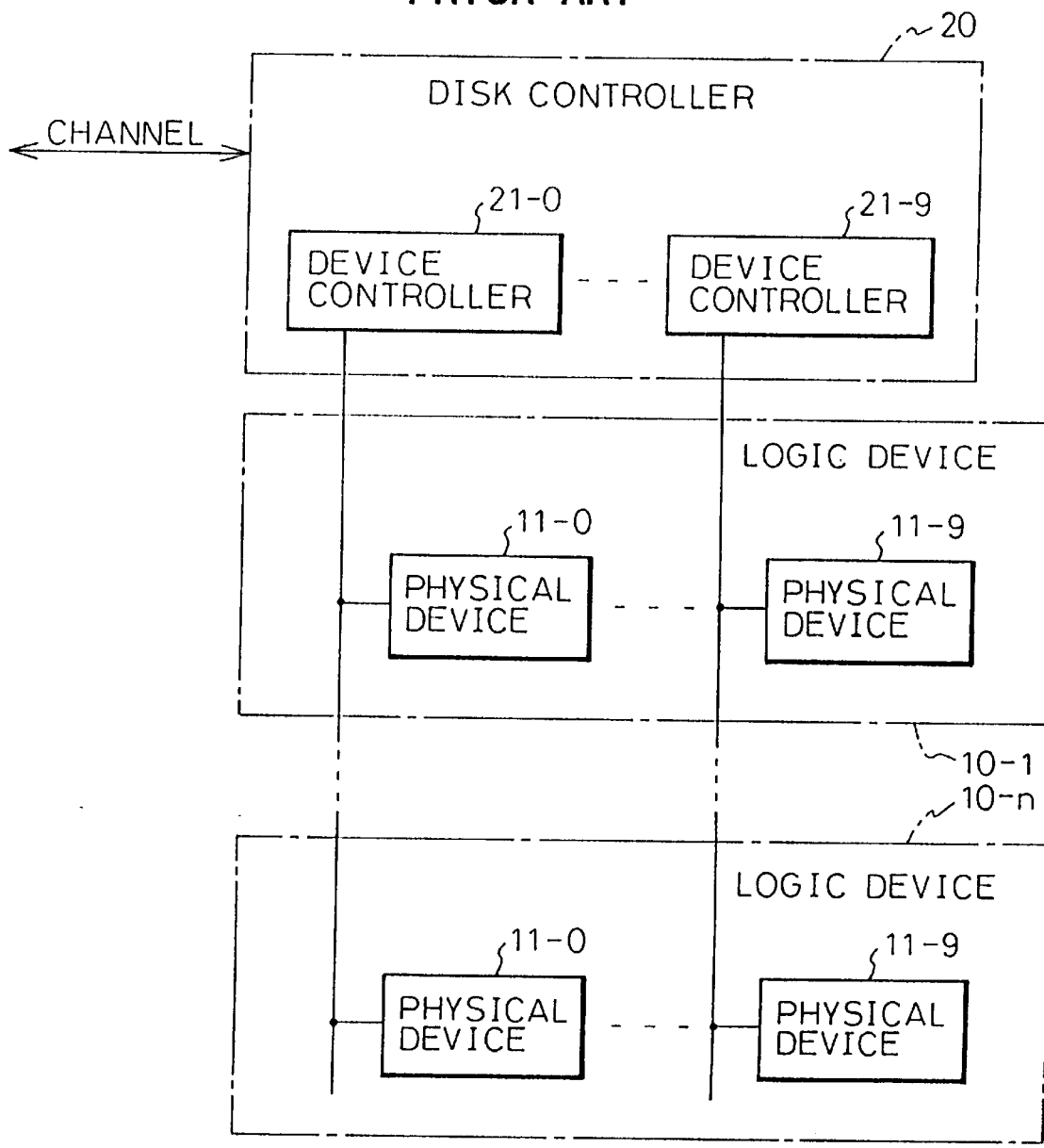
FIG. 1 is a prior art block diagram of a plurality of conventional disk array devices.

FIGS. 3(A) and 3(B) show constructions of a plurality of disk array devices to which a status display system according to the present invention is applied, in which the same elements as in FIGS. 1 and 2 are indicated with the same reference numerals. More specifically, FIG. 3(A) shows a construction of disk controller, and FIG. 3(B) shows a construction of a plurality of logic devices.

Namely, in FIGS. 3(A) and 3(B), the disk array devices are provided with logic devices 112-1 to 112-8 and a disk controller 220. It will be appreciated that the logic devices 112-1 to 112-8 are referred to merely as logic devices 112 when they are generally referred to.

Each of the logic devices 112 includes ten physical devices 111-0 to 111-9, which are connected to the respectively corresponding device controllers 221-0 to 221-9 of the disk controller 220, similar to the conventional disk array devices as in FIG. 1. More specifically, the respective device controllers 221-0 to 221-9 correspond to device control means 113 (FIG. 2), and eight physical devices are connected to each of these device controllers 221-0 to 221-9 through multiple lines. In FIG. 3(B), a two digit numeral is added to each reference numeral "111" indicating the physical device, the left-most digit of the right two digits indicating the logic device 112 that this physical device belongs to, and the right-most digit of the right two digits indicating the device controller 221 (FIG. 3(A)) corresponding to this physical device.

Hereafter, the physical devices 111-0 to 111-9 belonging to the respective logic devices 112 are referred to merely as physical devices 111 when they are generally referred to. Likewise, the device controllers 221-0 to 221-9 are referred to merely as device controllers 221 when they are generally referred to.

In FIGS. 3(A) and 3(B), the logic devices 112-1 to 112-8 are provided with DIP (Dual Inline Package) switches 212-1 to 212-8 respectively, and these logic devices set three-bit addresses which are predetermined by these DIP switches 212-1 to 212-8 for the respective physical devices 111 belonging thereto. For instance, the respective physical devices 111 may be provided with registers for setting the addresses, and predetermined values for the corresponding DIP switches 212 are set in these registers upon application of electric power to these registers.

This construction eliminates the trouble of setting an address for each physical device and can prevent occurrence of an error in setting the addresses.

Further in FIGS. 3(A) and 3(B), the disk controller 220 is provided with the aforementioned device controllers 221, a channel interface controller 222 for controlling commands and data transfer through a channel e.g., high-speed optical channel, and an array data controller 223 for interpreting the commands and dividing data transferred through the channel, and combining the data. The disk controller 220 is further provided with an auxiliary processor 224 which executes an initial microprogram loading (IMPL) process using a floppy disk device (FPD) 225, and signal processing in peripheral devices, such as data input through an operation panel 226 and a display.

On the other hand, each of the physical devices 111 which belongs to anyone of the aforementioned logic devices 112 is provided with a maintenance region, in which a microprogram to be loaded in the device controllers 221 is stored in advance, together with version number information indicating the version number of the microprogram.

A starting program for start-up operation loaded in a ROM provided in each device controller 221 includes a program for reading a microprogram stored in a disk of the corresponding physical device and storing the read microprogram in a data buffer used for the data transfer. Further, after the microprogram is stored in the data buffer, this starting program requires the auxiliary processor 224 to obtain the version number information of the microprogram stored in the floppy disk through the array data controller 223, and then compares the obtained version number information with the version number of the microprogram stored in the data buffer, and further executes a process to be described later in accordance with the comparison result.

If the version number information in the floppy disk corresponds with that in the data buffer, the microprogram stored in the data buffer is loaded in a control storage device. The aforementioned microprogram may be transferred to a RAM provided in the array data controller 223 capable of referring to all the device controllers 221, and may be loaded in another device controller 221 from this RAM.

On the other hand, if the above-mentioned version number information indicates two different version numbers, it may be appropriate that the IMPL processing is executed, in a similar manner to the conventional disk array device, and then the microprogram loaded in the control storage device and new version number information thereof are stored in the maintenance region of the corresponding disk.

In this construction, in the case where the version number of the microprogram is not changed from the version number allocated when the microprogram is previously loaded, the IMPL processing can also be executed for the device controllers 221 while the auxiliary processor 224 is executing the IMPL processing for the channel interface controller 222 or the like by utilizing the floppy disk device 225. Therefore, the time required to execute the IMPL processing for the whole system can be shortened.

After execution of the IMPL processing for the respective components of the disk controller 220 is completed in this manner, the disk controller 220 executes a start-up processing for the registered logic devices 112, thereby starting an operation as an auxiliary memory device for a host computer (not shown).

The disk controller 220 is provided with a status information table 227, a display information generator 228, and a display drive circuit 229 in addition to the aforementioned components. The array data controller 223, the status information table 227, the display information generator 228, and the display drive circuit 229 constitute status information generator means 121.

The status information table 227 contains registration information which indicates whether or not the logic devices corresponding to the respective addresses are incorporated into the disk array devices. Further, in regard to the logic devices 112 incorporated into the disk array devices, the table 227 contains status information concerning the status of those logic devices 112. This table 227 may include a battery back-up RAM or the like. When the disk array devices are installed, a worker performing the installation inputs the relationship between the installed logic devices and the corresponding addresses through the operation panel 226, and therefore the registration information can be registered in the status information table 227.

The array data controller 223 generates the status information of the designated logic devices 112 in accordance with the corresponding commands and responses when interpreting and sending the commands through the channel to the device controller 221 or when receiving the responses from the device controllers 221, and updates the content of the status information table 227.

The display information generator 228 refers to the status information table 227 in accordance with the instruction from the array data controller 223, generates and holds numerical codes corresponding to the status information of the respective logic devices 112, and sends these numerical codes as display information to the display drive circuit 229. The display drive circuit 229 generates drive signals (Sd) used to display the input numerical codes in LED display elements 215-1–215-8 made up of seven segments, and sends the generated drive signals to display means 122 provided in the respective logic devices 112.

The display drive circuit 229 may be constructed such that it periodically refers to eight numerical codes held in the display information generator 228 and decodes them, typically synchronous with a specified clock signal, thereby generating LED drive signals for the seven segments. Further, the drive circuit 229 may be constructed such that it generates a strobe signal (Sstb) which makes any one of these LED drive signals effective, synchronous with the above clock signal.

In this case, the LED display elements 215-1 to 215-8 made up of seven segments are provided as the display means 122 in the logic devices 112-1 to 112-8, respectively. Further, the above LED drive signals are commonly input to the LED display elements 215-1–215-8 and the strobe signals corresponding thereto are also respectively input to the LED display elements 215-1–215-8. In this way, the numerical codes indicative of the status of the respective logic devices 112 can be displayed in accordance with the input of the drive signals. The LED display elements 215-1 to 215-8 may be mounted on housings or the like for accommodating the respective logic devices 112, together with LED lamps which indicate whether or not the respective physical devices 111 are in the ready condition.

Hereinafter, a status information displaying operation will be described in accordance with an operation sequence of the disk array devices.

After the completion of execution of the IMPL processing for the respective components of the disk controller 220, the array data controller 223 refers to the status information table 227, designates the addresses of the logic devices 112 registered in the table 227, and instructs the device controllers 221 to start up the corresponding physical devices 111.

At this time, the array data controller 223 generates the status information indicative of a "unusable state" as status information for all the logic devices 112 and sends the same to the status information table 227, while instructing the display information generator 228 to generate the display information. In response to the instruction from the array data controller 223, the display information generator 228 generates numerical codes (e.g., "0") corresponding to this status information as display information indicating the status of the respective logic devices 112. The display drive circuit 229 generates and sends the drive signals corresponding to these numerical codes.

Consequently, the respective device controllers 221 begin to execute the start-up processing of the corresponding physical devices 111. At the same time, the numerical codes indicative of the "unusable state" are displayed by means of the LED display elements of the logic devices 112, thereby informing the operator that the logic devices are in the "unusable state."

When it is informed that start-up processing of the physical devices 111 corresponding to the designated addresses is completed from the respective device controllers 221, the array data controller 223 sends commands to the device controllers 221 requesting them to confirm the status of the corresponding physical devices 111 and also instructs the device controllers 221 to give notice of the confirmation results.

Thereafter, when the array data controller 223 receives the confirmation results to the effect that start-up processing of the physical devices 111 has been normally completed from all the device controllers 221, it generates the status information indicative of an "enable state", i.e., operable condition and sends the same to the status information table. At this time, the controller 223 also instructs the display information generator 228 to generate the display information. In response to the instruction from the controller 223, the display information generator 228 generates numerical codes corresponding to all the logic devices, and the display drive circuit 229 generates the drive signals corresponding to the generated numerical codes. Accordingly, the displays given by the LED display elements 215 of the corresponding logic devices 112 are changed, thereby informing the operator that the logic devices are in the "enable state". Consequently, the operator can rapidly understand the present status of the logic devices.

On the other hand, if the array data controller 223 receives the confirmation result indicating that start-up processing of the physical devices has not normally completed from at least one of the device controllers 221, it does not execute the above process to change the status information. In this case, the numerical codes indicative of the "unusable state" are continuously displayed by the LED display elements 215 of the corresponding logic devices 112. Accordingly, in this case, even if LED lamps are lit indicating that the physical devices 111 belonging to the corresponding logic devices 112 are in the ready condition, the operator is allowed to obtain the information indicating that the logic devices 112 have failed in start-up processing and are therefore presently in the unusable state by seeing the displays given by the LED display elements 215.

By displaying the status of each of the overall logic devices as an overall logic device in this manner, the disadvantage, that the operator is likely to misunderstand the status of the logic devices 112 through the LED displays indicating the ready condition of the respective physical devices 111 as in the conventional system, can be resolved. Further, it becomes possible to provide the operator with accurate information rapidly.

Further, by executing the process to be described later in accordance with various commands input from the host computer through the channel interface controller 222, the information about the change of the status of the logic devices 112 in response to the execution of these commands can be given to the operator rapidly.

For instance, in response to the command for disconnecting the logic devices from the host computer, the array data controller 223 first sends the commands to the device controllers 221, thereby instructing execution of the disconnection command. Then, the array data controller 223 changes the status information of the corresponding logic devices 112 in the status information table 227 so that the status information indicates a "disconnected state", and instructs the display information generator 228 to generate the display information.

In response to this instruction, the display information generator 228 generates a numerical code (e.g., "2") corresponding to this status information, and the display drive circuit 229 supplies the corresponding drive signals to the LED display elements 215 of the corresponding logic devices 112 so as to display the numerical code indicative of the "disconnected state". These displays are maintained until the status information is changed.

Thereafter, when a command for incorporating the disconnected logic devices 112 into the system is input from the host computer, the array data controller 223 first sends the commands to the corresponding device controllers 221, and instructs execution of the incorporation command. Next, the array data controller 223 changes the status information of the corresponding logic devices 112 in the status information table 227 so that the status information indicates the "enable state", and instructs the display information generator 228 to generate the display information. In response to this instruction, the display information generator 228 and the display drive circuit 229 operate in a manner similar to the above process, and the numerical code indicative of the "enable state" is displayed by the LED display elements 215 of the corresponding logic devices 112.

Further, in response to an initialize command from the host computer, the array data controller 223 sends the commands to the device controllers 221 and instructs them to execute the initialize command, similar to the aforementioned disconnection command. Then, the array data controller 223 changes the status information of the corresponding logic devices 112 in the status information table 227 so that the status information indicates an "initialized state", and instructs the display information generator 228 to generate the display information.

In response to this instruction, the display information generator 228 generates a numerical code (e.g., "3") corresponding to this status information, and the display drive circuit 229 supplies the corresponding drive signals to the LED display elements 215 of the corresponding logic devices 112 so as to display the numerical code indicating that "the logic devices are being initialized". These displays are maintained until the state information is changed.

In this case, in accordance with responses from the respective device controllers 221 indicating that the initialize command is completed, the array data controller 223 may execute a confirmation process, similar to the aforementioned start-up process. Upon receiving the responses indicating that the initialize command is normally completed from all the device controllers 221, the controller 223 updates the contents of the status information table 227 and instructs the display information generator 228 to generate the display information. At this time, the controller 223 changes the status information of the corresponding logic devices 112 so that the status information indicates the "enable state". In response to the controller 223, the display information generator 228 and the display drive circuit 229 operate, and therefore the corresponding numerical codes are displayed by the LED display elements 215 of the corresponding logic devices 112.

In this way, besides the state information indicating whether or not the logic devices 112 are successfully started up, the operator is allowed to obtain detailed status information which indicates that the process is executed in accordance with the disconnection command and the initialize command from the host computer. This advantage enables the operator to obtain preliminary knowledge about a failure before the complicated diagnostic program is started in the host computer, even though the incorporation command and the initialize command have not been normally completed. Thus, a maintenance operation for the disk array device, etc., can be carried out rapidly, without substantially interrupting the data transfer at high speed.

Furthermore, upon discovering an abnormality in the data from the respective device controllers 221, the array data controller 223 drives the device controllers 221 so as to reconstruct the data stored in the corresponding logic device 112.

At this time, if the array data controller 223 changes the status information of the corresponding logic device 112 so that this status information indicates a "data reconstructing state", and also instructs the display information generator 228 to update the display information, a numerical code (e.g., "4") corresponding to this status information, i.e., "data reconstructing state", is displayed so as to inform the operator of this status information in a manner similar to the above process. In this case as well, the display of this status information may be maintained until the data reconstruction process for the logic device 112 is normally completed in a manner similar to the aforementioned process executed in response to the initialize command. This construction enables the operator to obtain a preliminary knowledge about a failure from this display in cases where the data reconstruction process has failed. Thus, the maintenance operation for the disk array device, etc., can be carried out rapidly, and therefore the time required for the maintenance operation can be shortened, which leads to a reduction of the burden on the operator.

It is sufficient to provide the display means 122 in correspondence with the respective logic devices 112. For example, the LED display elements 215 corresponding to all the logic devices 112 may be mounted together on the housing for accommodating the display controller 220.

As described above, according to the present invention, the status of respective physical devices is collected so as to generate and display status information of a logic device constituted by these physical devices, including various information effective for storage device. Accordingly, the accurate status information as an overall logic device can be offered to an operator rapidly. Therefore, it becomes possible for an operator to easily obtain preliminary knowledge about a failure before a complicated diagnostic program is started in a host computer even though a failure has actually occurred. Thus, in the disk array device etc., an appropriate maintenance operations can be carried out rapidly, without substantially interrupting the data transfer at high speed.

Figure 5:
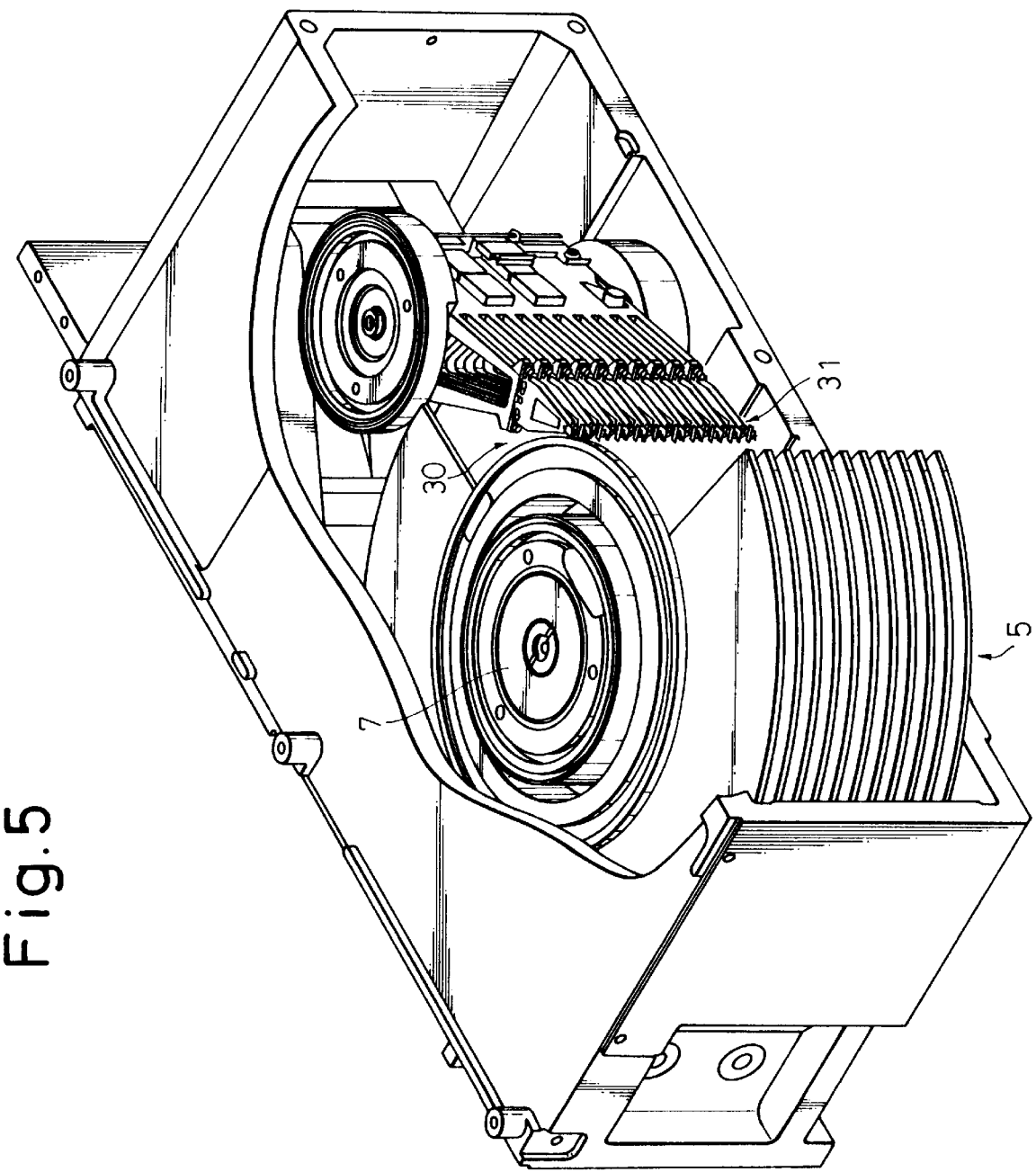
FIG. 5 is a perspective view, partially cut away, showing a mechanism of a magnetic disk drive.

Here, in order to facilitate understanding of the embodiment according to the present invention, a partially sectional plan view showing a mechanism of one magnetic disk drive and a perspective view, partially cut away, showing a mechanism of one magnetic disk drive are respectively illustrated in FIGS. 4 and 5. As seen from these figures, a plurality of disks (e.g., eleven disks in FIG. 5) 5 are rotated simultaneously. The tracks on a recording surface of each disk 5 are written with a predetermined data pattern. However, the tracks at both ends of the inner zone and the outer zone of the disk 5 are formed as guard bands 50 in which a particular pattern is written, instead of a data pattern, which particular pattern is used for stopping a seek operation (read/write operation) of two kinds of heads 30 and 31. Further, at the inner and the outer sides of the guard band 50, an erase zone 55 (FIG. 4) is formed for mechanically stopping the heads 30 and 31.

Figure 6:
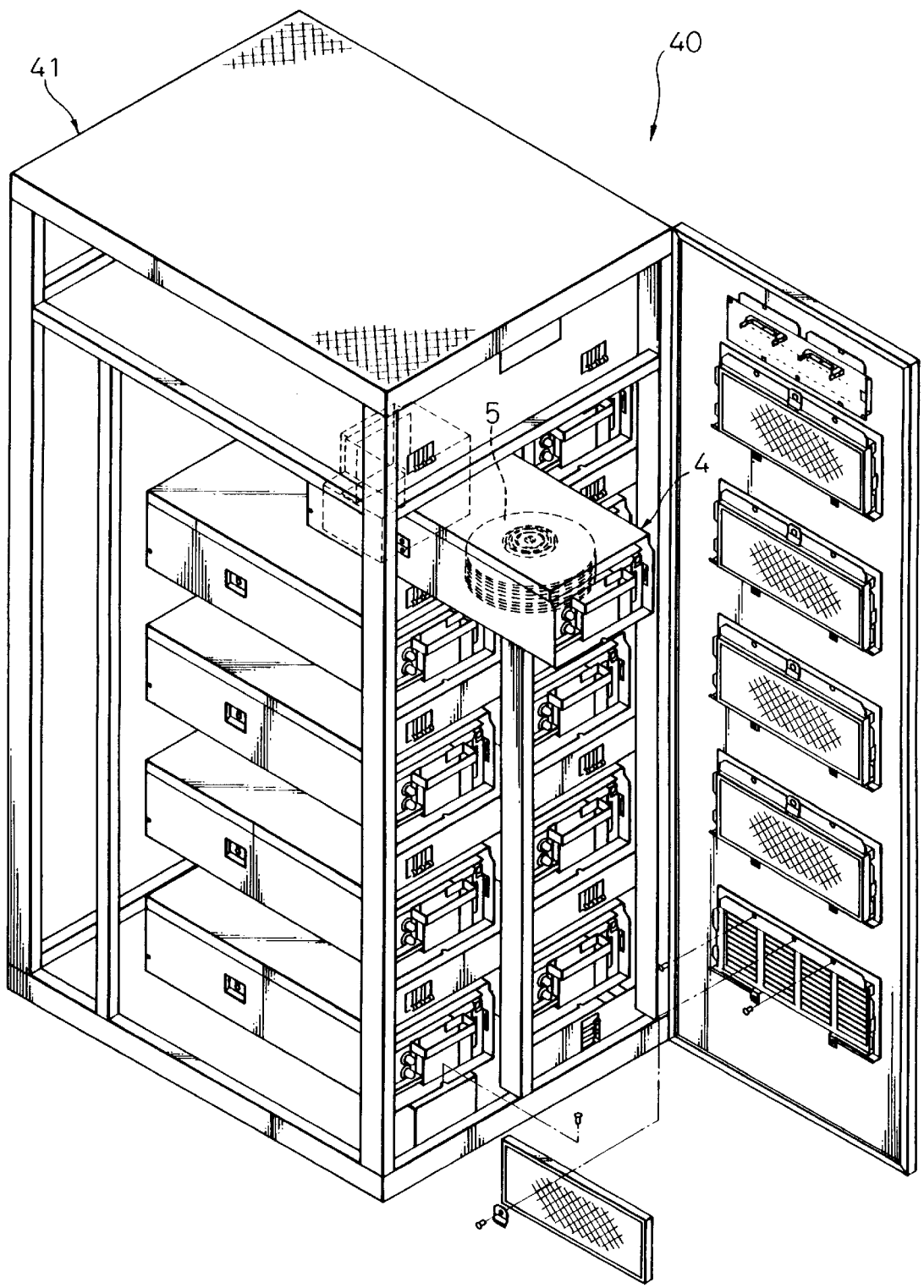
FIG. 6 is a perspective view showing overall magnetic disk array device.

Preferably, the present invention is adopted to a disk array drive 40 as shown in FIG. 6, wherein reference numeral 4 denotes a magnetic disk drive that includes the disks 5 and 41 a housing that can accommodate a plurality of magnetic disk drives. In this case, the disk array device is composed of eight disk drives for data transfer, one parity disk drive and one spare storage disk drive.

Figure 7:
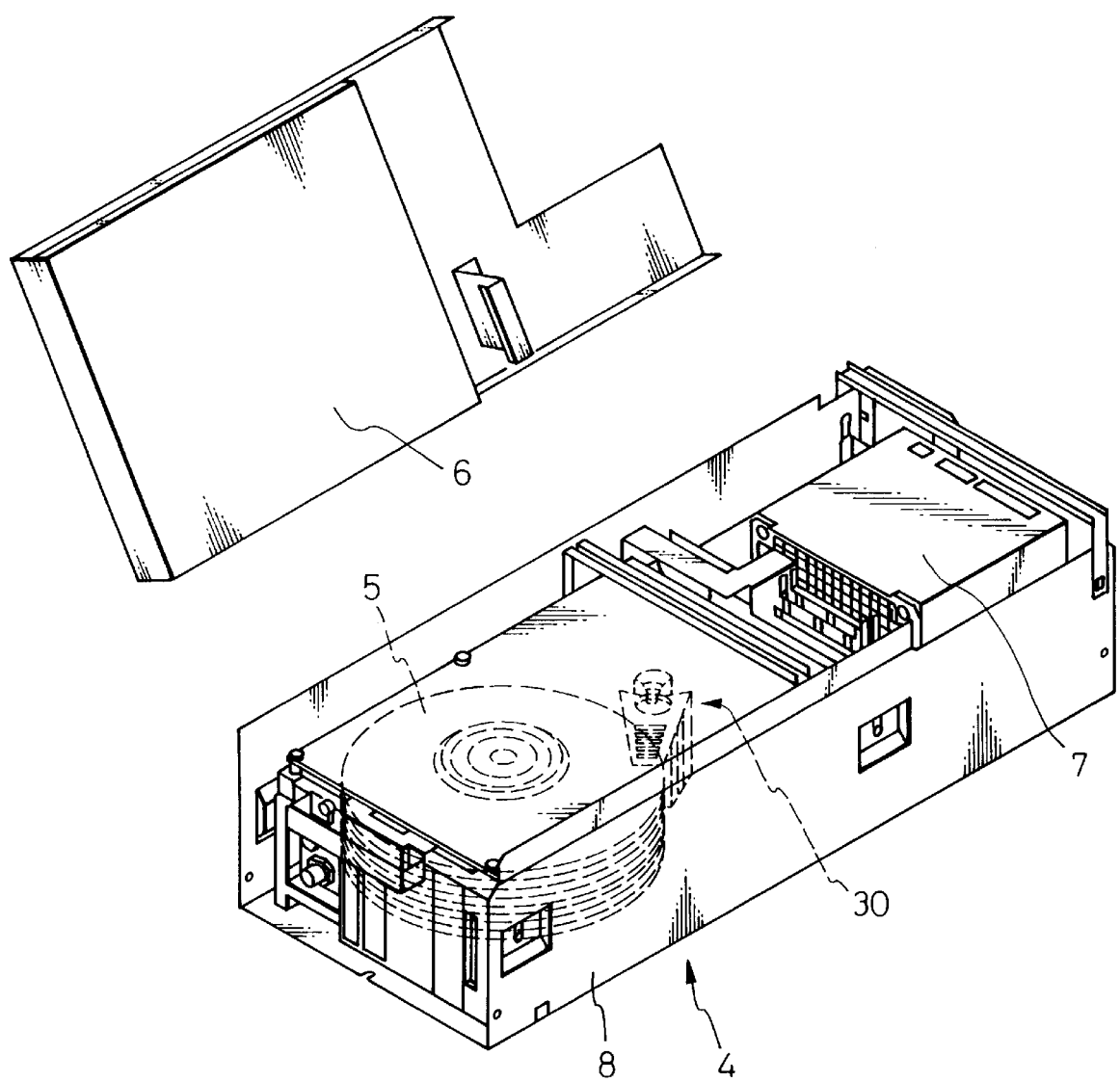
FIG. 7 is a perspective view of a single unit of a magnetic disk drive removed from magnetic disk array device as in FIG. 6.

Further, FIG. 7 is a single unit of a magnetic disk drive removed from disk array devices as shown in FIG. 6. The magnetic disk drives 4 constituting each unit of disk array device comprise a disk enclosure 8 and cover 6. The disk enclosure 8 and cover 6 serve to contain the disks 5 and the peripheral circuit module 7 inside the disk enclosure 8.

Each magnetic disk drive 4 is constructed to be easily inserted into the housing 41 (FIG. 6) and also easily removed therefrom, so that a maintenance operation can be rapidly performed when a failure, etc., have occurred.

Figure 8:
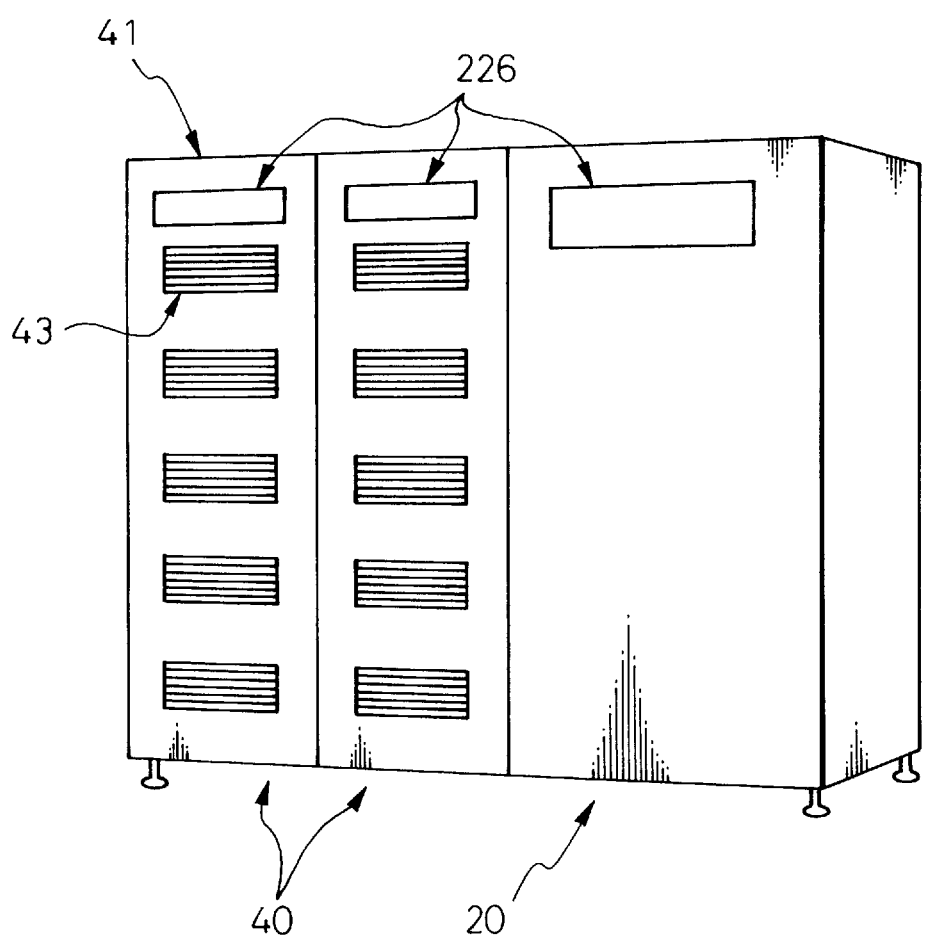
FIG. 8 is a perspective view showing an appearance of a plurality of disk array devices to which the present invention is applied.

Further, in order to clarify the characteristics of the present invention in the operation panel, an appearance of a plurality of disk array devices including the operation panel 226 is illustrated in FIG. 8. More specifically, front views showing a portion of operation panel located at each logic device side and another portion thereof located at disk controller side are illustrated in FIGS. 9 and 10, respectively.

In FIG. 8, a disk array system is constituted by a plurality of disk array devices, e.g., two disk array devices 40 and a disk controller 20 for controlling these disk array devices 40. The two disk array devices 40 and the disk controller is arranged to be contained in a housing 41. In this case, the front side of the housing 41 at each disk array device 40 is provided with the operation panel 226, in addition to a plurality of ventilation windows 43 for radiating heat generated from a plurality of disk drives (not shown in FIG. 8). Further, the front side of the housing 41 at the disk controller 20 is also provided with the operation panel 226.

Figure 9:
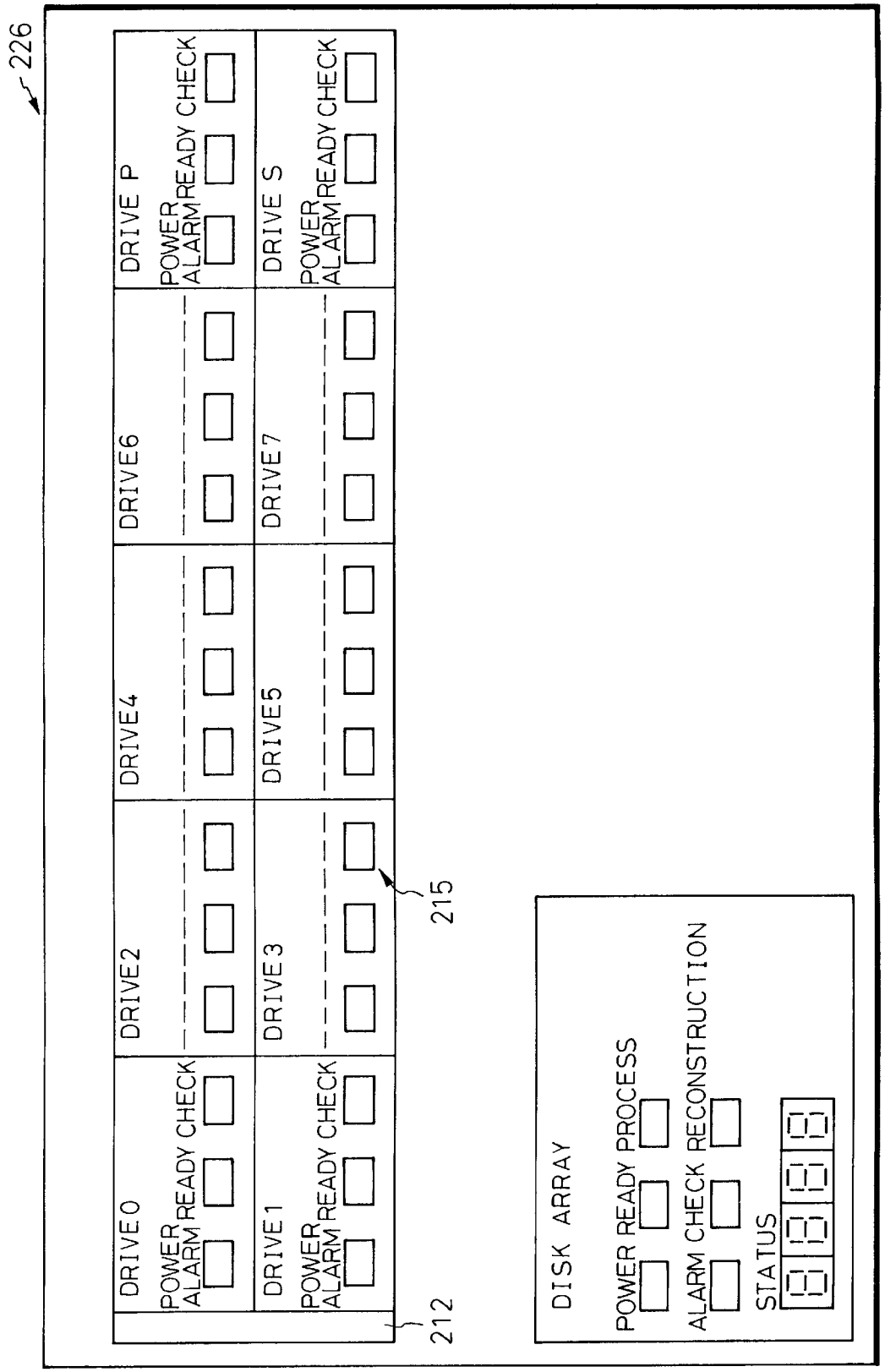
FIG. 9 is a front view showing a portion of operation panel located at each logic device side.
Figure 10:
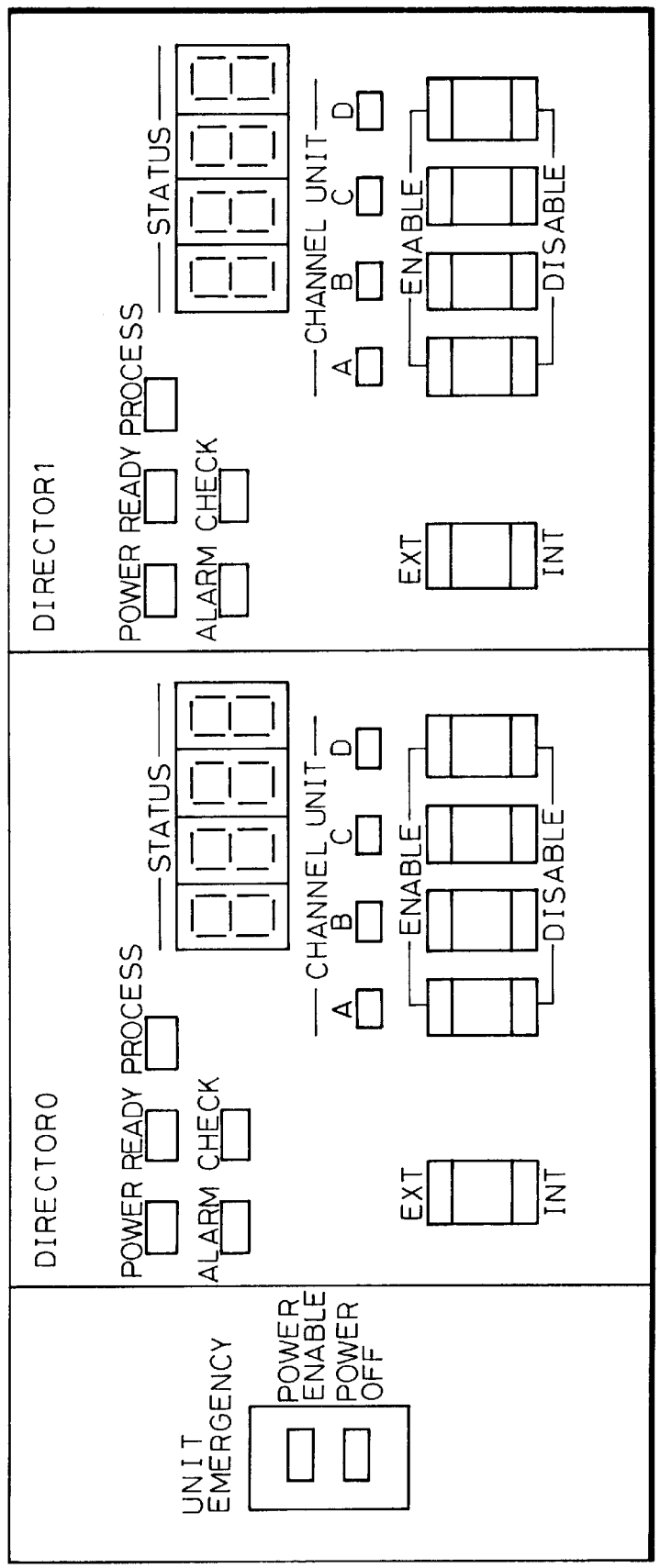
FIG. 10 is a front view showing another portion of operation panel located at disk controller side.

In regard to a portion of operation panel 226 at each logic device side, as shown in FIG. 9, the upper part of the operation panel 226 is operative to display the status information of the individual physical devices, including the disk drives for data transfer (Drives 0 to 7), a parity disk drive (Drive P) and a spare disk drive (Drive S). In the panel positions corresponding to these disk drives, the following three kinds of LED display elements 215 are provided, respectively.

A first element is a power and alarm lamp for indicating that an electric power is supplied to the corresponding disk drive and that an electric power source has fallen into an unusual condition and that a fan alarm, a thermal alarm or the like has been issued.

A second element is a ready lamp for indicating that the corresponding disk drive and the controller can be connected with each other so that a command can be sent from the controller to the disk drive.

A third element is a check lamp for checking whether or not something abnormal has occurred during the self diagnosis of the disk drive and the operation thereof.

Preferably, these three kinds of LED display elements 215 are constituted by the lamps of different colors, respectively, so that they can be distinguished from each other.

Further, dip switches 212, which is mounted on a logic circuit board inside the front portion of the housing 41, serve to set the addresses for the physical devices.

Further, in FIG. 9, the lower part of the operation panel 226 is operative to display the status information of the disk array device as an overall logic device, which is characteristic of the present invention. More concretely, the following six kinds of lamps of predetermined colors are provided in the lower part of the operation panel 226. First, there is a power lamp for indicating that the electric power is supplied to the logic device. Second, there is a ready lamp for indicating that the logic device and the controller can be connected with each other. Third, there is a process lamp for indicating that read/write operations of the logic device are being performed. Fourthly, there is an alarm lamp for indicating that something abnormal has occurred in any one of the disk drives. Fifthly, there is a check lamp for checking whether or not something abnormal has occurred in any one of the disk drives. Sixthly, there is a reconstruction lamp for indicating that data reconstruction processing is being executed for the logic device.

Furthermore, in a status display portion, error message corresponding to the error information of the logic device can be displayed as the numerical error code. Also, the number of disk drive, in which data reconstruction processing is being executed, can be displayed. In this case, the portion of operation panel for logic device may be located at the right side of the portion of operation panel for individual physical devices.

In FIG. 10, the operation panel 226 for disk controller is operative to display the status information concerning the relationship between the disk controller and a host computer.

Figure 11B:
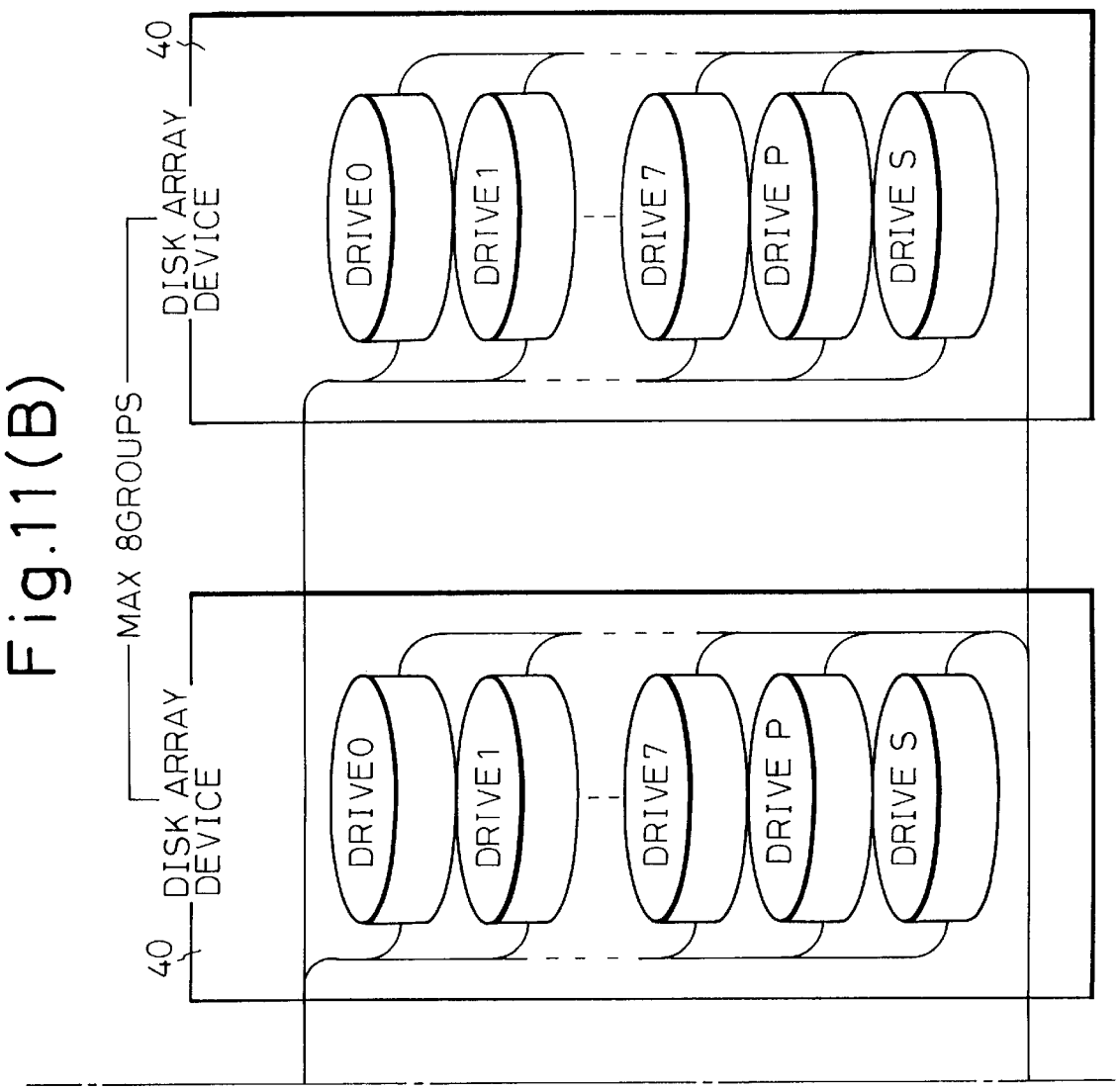

To be more specific, five kinds of lamp, similar to the above-mentioned lamps of FIG. 9 covering from the power lamp through the check lamp, are provided for each of two directors 0, 1 constituting the disk controller. Also, a status display portion is provided for each director, displaying error message corresponding to the error information of the director. Further, a number of seesaw switches are provided for each director. By setting the respective four seesaw switches for selecting channels in either "enable state" or "disable state", the desired channel can be selected from the channel A, B, C and D for each director. Further, by setting a seesaw switch for setting control mode in either "external control" or "internal control", a data exchange between the channel and the director is controlled by the internal control signals from the disk controller per se or by the external signals. Further, if an emergency occurs, it is possible for an electric power to be rapidly broken off (power off) by manual operation. Finally, block diagrams of a disk controller 20 and a plurality of disk array devices 40 controlled by the disk controller 20 are illustrated in FIGS. 11(A) and 11(B), respectively. In this case, eight groups of disk array devices at maximum can be controlled by the disk controller 20 having the respectively corresponding directors.

In FIG. 11(A), high-speed optical channels A, B, C and D, and a high-speed optical control module functioning as an optical/electric interface (O/E interface), are provided to enable data to be transferred at high speed between the channel and the disk array devices 40. The disk controller 20 consists of two directors. Each director consists of two modules: the optical control module as described above; and an array control module to control the disk array devices 40.

The latter module is divided into ten device controllers to control the respectively corresponding disk drives (Drives 0–7, Drive P and Drive S as shown in FIG. 11(B)) and an array controller to transfer the data to or from each of the device controllers.

The two directors in the disk controllers are independent of each other. These directors can control two groups of disk array devices simultaneously. The operation panel according to the present invention can display the status information of each of two disk array devices as an overall logic device. Therefore, even if the number of groups of disk array drives is increased, the status information of the respective disk array devices can be displayed separately.

We claim:

1. A status display system for a storage device including at least one logic device addressing physical memory locations on a plurality of physical devices, and a plurality of device control means for controlling operations of said physical devices of a corresponding logic device in accordance with a given command from a host device, wherein said system comprises:

status information generating means operatively connected to each of the physical devices for generating status information indicating the present operational condition of the logic device, based on information about operational condition of the physical devices of the corresponding logic device;

wherein said status information generating means, after being informed of the present operational condition of at least one physical device from a corresponding control means, request a confirmation from other control means that correspond to physical devices of the corresponding logic device and wait for a reply from said other control means, so as to generate said status information of the logic device and display means for displaying said status information of the logic device generated by said status information generating means.

2. A status display system for a storage device as set forth in claim 1, wherein said status information generating means collect commands given to the plurality of device control means and responses to the commands given from the plurality of device control means, and generates and sends a status information for said logic device; and said display means is provided at a location corresponding to a location of said logic device for displaying the status information in accordance with the respectively corresponding status information input from said status information generating means.

3. A status display system as set forth in claim 2, wherein said storage device is comprised of a magnetic disk array device.

4. A status display system as set forth in claim 2, wherein said logic device addresses physical memory locations on a plurality of magnetic disk drives, and each of said physical devices is comprised of a single magnetic disk drive.

5. A status display system as set forth in claim 2, wherein said status information generating means includes:

a status information table which contains registration information that indicates whether or not the designated logic device is incorporated into said storage device;

an array data controller which generates the status information of said designated logic device and updates the content of the status information table;

a display information generator which refers to the status information table in accordance with the instruction from said array data controller, and generates and holds given codes corresponding to the status information of said at least one logic device; and a display drive circuit which generates drive signals used to display said given codes issued from said display information generator, and sends said drive signals to said display means.

6. A status display system as set forth in claim 5, wherein said display means includes light emitting diode display elements which display the respectively corresponding status information of said at least one logic device in accordance with said drive signals.

7. A status display system as set forth in claim 2, wherein said system includes means for indicating whether or not said logic device is in an operable condition in the case where start-up processing of said storage device has been performed.

8. A status display system as set forth in claim 2, wherein said system includes means for indicating whether or not said logic device is in an operable condition in the case where initial microprogram loading has been performed.

9. A status display system as set forth in claim 2, wherein said system includes means for indicating whether or not said logic device is in an operable condition in the case where the reconstruction of data in said storage device has been performed.

10. A status display system as set forth in claim 2, wherein said system includes means for indicating whether or not the processing is accurately executed in accordance with the given command from the host device.

11. A disk array system including:

a plurality of physical devices;

an array data controller which accesses said plurality of physical devices as a logic device;

a plurality of device controllers which access each of said physical devices; and a status information generating means for collecting status information indicating the present operational condition of each of said physical devices, through said device controllers, and for generating status information indicating the present operational condition of said logic device, based on status information about each of said physical devices, display means for displaying said status information of the logic device generated by said status information generating means.

12. A disk array system as set forth in claim 11, wherein said status information generating means include status information table means which store said status information indicating the present condition of said logic device.

13. A disk array system as set forth in claim 11, wherein said display means further displays said status information indicating the present condition of said logic device by indicating at least one from the group of logical device states consisting of unusable, enable, initializing, disconnected and data reconstructing.

14. A disk array system as set forth in claim 11, wherein said display means further indicates at least one from the group of logical device information consisting of power, ready, process, alarm, check and numerical error code.

15. A status display system as set forth in claim 1, wherein said display means further displays said status information indicating the present condition of said logic device by indicating at least one from the group of logical device states consisting of unusable, enable, initializing, disconnected and data reconstructing.

16. A status display system as set forth in claim 1, wherein said display means further indicates at least one from the group of logical device information consisting of power, ready, process, alarm, check and numerical error code.

* * * * *